United States Patent
Nian et al.

(10) Patent No.: US 12,326,558 B2
(45) Date of Patent: Jun. 10, 2025

(54) HEAD-UP DISPLAY AND OPERATING METHOD THEREOF

(71) Applicant: AUO Corporation, Hsin-Chu (TW)

(72) Inventors: Han-Sheng Nian, Hsin-Chu (TW);
Seok-Lyul Lee, Hsin-Chu (TW);
Ming-Jui Wang, Hsin-Chu (TW);
Chih-Chiang Chen, Hsin-Chu (TW);
Chia-Hsin Chung, Hsin-Chu (TW);
Yu-Cheng Shih, Hsin-Chu (TW);
Cheng-Chan Wang, Hsin-Chu (TW);
Hsin-Hung Li, Hsin-Chu (TW);
Wei-Syun Wang, Hsin-Chu (TW);
Sheng-Ming Huang, Hsin-Chu (TW)

(73) Assignee: AUO CORPORATION, Hsin-Chu (TW)

( * ) Notice: Subject to any disclaimer, the term of this patent is extended or adjusted under 35 U.S.C. 154(b) by 290 days.

(21) Appl. No.: 18/071,031

(22) Filed: Nov. 29, 2022

(65) Prior Publication Data
US 2024/0012241 A1 Jan. 11, 2024

(30) Foreign Application Priority Data
Jul. 5, 2022 (TW) ................... 111125228

(51) Int. Cl.
*G02B 27/10* (2006.01)
*F21V 8/00* (2006.01)
*G02B 27/01* (2006.01)

(52) U.S. Cl.
CPC ....... *G02B 27/0101* (2013.01); *G02B 6/0038* (2013.01); *G02B 27/1066* (2013.01); *G02B 2027/0118* (2013.01); *G02B 2027/0123* (2013.01)

(58) Field of Classification Search
CPC ................... G02B 2027/0123; G02B 27/1066
See application file for complete search history.

(56) References Cited

U.S. PATENT DOCUMENTS

| | | |
|---|---|---|
| 5,694,230 A | 12/1997 | Welch |
| 9,507,150 B1 | 11/2016 | Stratton |
| (Continued) | | |

FOREIGN PATENT DOCUMENTS

| | | | | |
|---|---|---|---|---|
| CN | 110036235 B | 11/2020 | | |
| WO | WO-2023088639 A1 * | 5/2023 | ......... | G02B 27/0103 |

OTHER PUBLICATIONS

Munkh-Uchral Erdenebat et al., Waveguide-Type Head-Mounted Display System for AR Application, State of the Art Virtual Reality and Augmented Reality Knowhow, Published: Mar. 20, 2018, https://www.intechopen.com/chapters/60066.

*Primary Examiner* — Charlie Y Peng
(74) *Attorney, Agent, or Firm* — WPAT, PC

(57) ABSTRACT

A head-up display includes an image generating unit and a waveguide glass. The waveguide glass faces toward the image generating unit. The waveguide glass includes a first microstructure, a second microstructure and a third microstructure. The first microstructure has a first width. The second microstructure is adjacent to the first microstructure. The third microstructure is adjacent to the second microstructure. The third microstructure has tiling areas adjacent to each other. A gap between the two adjacent tiling areas is less than half of the first width.

15 Claims, 5 Drawing Sheets

(56) References Cited

U.S. PATENT DOCUMENTS

| | | | | |
|---|---|---|---|---|
| 2014/0140654 | A1* | 5/2014 | Brown | G02B 27/0172 385/10 |
| 2018/0157042 | A1* | 6/2018 | Wall | G02B 27/0172 |
| 2018/0188528 | A1* | 7/2018 | Browy | G02B 27/0081 |
| 2018/0373115 | A1 | 12/2018 | Brown | |

* cited by examiner

HEAD-UP DISPLAY AND OPERATING METHOD THEREOF

RELATED APPLICATION

This application claims priority to Taiwan Application Serial Number 111125228, filed Jul. 5, 2022, which is herein incorporated by reference in its entirety.

BACKGROUND

Field of Invention

The present disclosure relates to a head-up display and an operating method of the head-up display.

Description of Related Art

In general, a head-up display applied to vehicles may provide images and combine the images with a real scene to provide auxiliary information related to driving. However, a field of view (FOV) of a conventional head-up display is usually limited in a range from 6 degrees to 8 degrees. That is, the conventional head-up display may only provide a space of 6 degrees to 8 degrees for eyes to observe. If the field of view of the head-up display is expected to increase, an overall volume of the head-up display must be increased, thereby increasing a space limitation of the head-up display. In addition, after the image provided by the head-up display is reflected to the eyes through slanted windshields of the vehicles, ghost images may be generated due to difference of an optical path of the slanted windshields. Therefore, a driver may observe a blurred image, so an optical effect of the head-up display is reduced.

SUMMARY

An aspect of the present disclosure is related to a head-up display.

According to one embodiment of the present disclosure, a head-up display includes an image generating unit and a waveguide glass. The waveguide glass faces toward the image generating unit. The waveguide glass includes a first microstructure, a second microstructure and a third microstructure. The first microstructure has a first width. The second microstructure is adjacent to the first microstructure. The third microstructure is adjacent to the second microstructure. The third microstructure has tiling areas adjacent to each other. A gap between the two adjacent tiling areas is less than half of the first width.

In one embodiment of the present disclosure, the first microstructure positionally corresponds to the second microstructure in a first direction.

In one embodiment of the present disclosure, the second microstructure positionally corresponds to the third microstructure in a second direction perpendicular to the first direction.

In one embodiment of the present disclosure, the first width of the first microstructure is in a range from 4 mm to 5 mm.

In one embodiment of the present disclosure, the gap between the two adjacent tiling areas is in a range from 0.5 μm to 1.5 μm.

In one embodiment of the present disclosure, one of the tiling areas of the third microstructure has a plurality of protruding portions, and the protruding portions are aligned to each other.

In one embodiment of the present disclosure, the second microstructure has a second width, and the second width is greater than the first width.

In one embodiment of the present disclosure, the third microstructure has a third width, and the third width is the same as the second width.

In one embodiment of the present disclosure, the third width of the third microstructure is in a range from 325 mm to 330 mm.

In one embodiment of the present disclosure, the first microstructure has a first length, the second microstructure has a second length, and the first length is the same as the second length.

In one embodiment of the present disclosure, the third microstructure has a third length, and the third length is greater than the second length.

In one embodiment of the present disclosure, the third length of the third microstructure is in a range from 190 mm to 200 mm.

An aspect of the present disclosure is related to an operating method of a head-up display.

According to one embodiment of the present disclosure, an operating method of a head-up display includes: emitting a light to a first microstructure of a waveguide glass by an image generating unit; transmitting the light to a second microstructure of the waveguide glass by the first microstructure of the waveguide glass, wherein the second microstructure is adjacent to the first microstructure; and transmitting the light to a third microstructure of the waveguide glass by the second microstructure of the waveguide glass, wherein the third microstructure is adjacent to the second microstructure and has tiling areas adjacent to each other, and a gap between the two adjacent tiling areas is less than half of a first width of the first microstructure.

In one embodiment of the present disclosure, transmitting the light to the second microstructure by the first microstructure is performed such that the light is transmitted in a first direction.

In one embodiment of the present disclosure, transmitting the light to the third microstructure by the second microstructure is performed such that the light is transmitted in a second direction perpendicular to the first direction.

In the embodiments of the present disclosure, the third microstructure of the waveguide glass of the head-up display is formed by the tiling areas adjacent to each other, and the third microstructure may transmit the light to a target area (such as an eye position of a driver), so that the driver may receive driving auxiliary information provided by the light and a real scene. The third microstructure formed by the adjacent tiling areas has a larger feature size, so the head-up display may provide a larger field of view (FOV) to increase an application value of the head-up display. In addition, the light may be transmitted to the target area by the first microstructure, the second microstructure and the third microstructure, ghost image may be improved. Therefore, a driver may observe the clear auxiliary information, and the optical effect of the head-up display may be improved.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
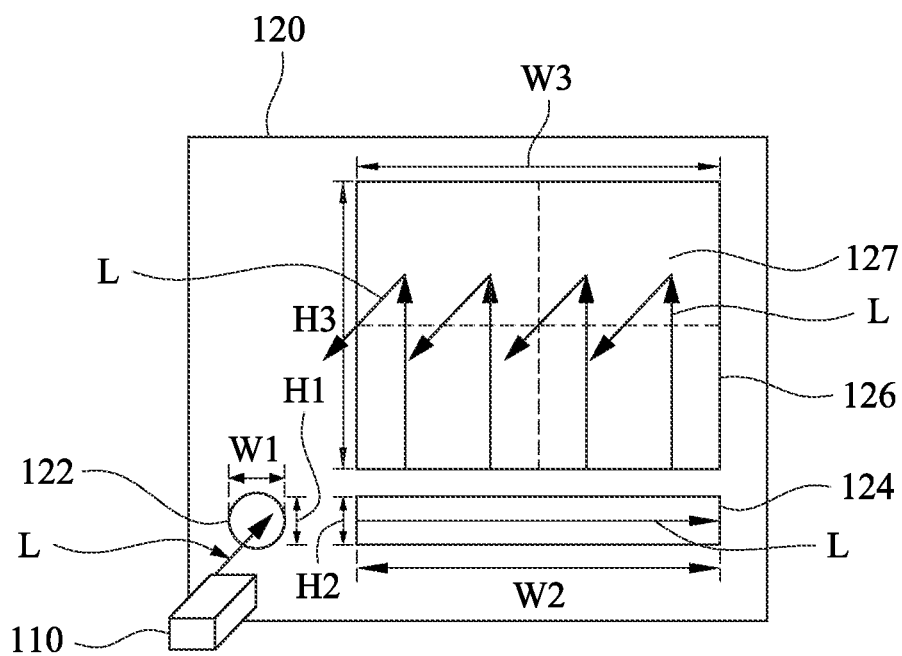
FIG. 1 illustrates a schematic view of using a head-up display according to one embodiment of the present disclosure.
Figure 1:
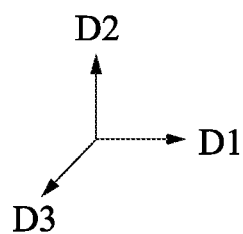

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Spatially relative terms, such as "beneath," "below," "lower," "above," "upper," "front," "back" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 illustrates a schematic view of using a head-up display 100 according to one embodiment of the present disclosure. The head-up display 100 includes an image generating unit 110 and a waveguide glass 120. The waveguide glass 120 faces toward the image generating unit 110. The waveguide glass 120 includes a first microstructure 122, a second microstructure 124 and a third microstructure 126. In the following description, "width" means the dimension along a first direction D1, and "length" means the dimension along a second direction D2. The first microstructure 122 of the waveguide glass 120 has a first width W1 and a first length H1. The second microstructure 124 of the waveguide glass 120 is adjacent to the first microstructure 122. The second microstructure 124 has a second width W2 and a second length H2. The third microstructure 126 of the waveguide glass 120 is adjacent to the second microstructure 124. The third microstructure 126 has a third width W3 and a third length H3. The third microstructure 126 of the waveguide glass 120 has a plurality of tiling areas 127 adjacent to each other.

In this embodiment, light L may be transmitted to the first microstructure 122 of the waveguide glass 120 by the image generating unit 110. For example, the first microstructure 122 of the waveguide glass 120 may be an in-coupling optical element, so that the light L may be totally reflected in the waveguide glass 120 after being incident on the waveguide glass 120. Next, the first microstructure 122 of the waveguide glass 120 may transmit the light L to the second microstructure 124 of the waveguide glass 120. For example, the second microstructure 124 of the waveguide glass 120 may be a folded optical element, so that the light L may be expanded along the first direction D1. Next, the second microstructure 124 of the waveguide glass 120 may transmit the light L to the third microstructure 126 of the waveguide glass 120. For example, the third microstructure 126 of the waveguide glass 120 may be an out-coupling optical element, so that the light L may be expanded along the second direction D2, and the light L may be transmitted to a target area (such as an eye position of a driver) along a third direction D3. The light L transmitted by the image generating unit 110 may be expanded along the first direction D1 and the second direction D2 after passing through the second microstructure 124 and the third microstructure 126. The light L may be transmitted to the eye position of the driver along the third direction D3. Therefore, the driver may receive the light L including driving information.

Particularly, the third microstructure 126 of the waveguide glass 120 of the head-up display 100 is formed by the tiling areas 127 adjacent to each other, and the third microstructure 126 may transmit the light L to a target area (such as an eye position of a driver) along the third direction D3, so that the driver may receive driving auxiliary information provided by the light L and a real scene. The third microstructure 126 formed by the tiling areas 127 has a larger feature size, so the head-up display 100 may provide a larger field of view (FOV) to increase an application value of the head-up display 100. In addition, the light L may be transmitted to the target area by the first microstructure 122, the second microstructure 124 and the third microstructure 126, ghost image may be improved. Therefore, a driver may observe the clear auxiliary information, and the optical effect of the head-up display 100 may be improved.

In some embodiments, the first width W1 of the first microstructure 122 is in a range from 4 mm to 5 mm. The second width W2 of the second microstructure 124 is greater than the first width W1 of the first microstructure 122, and the third width W3 of the third microstructure 126 is the same as the second width W2 of the second microstructure 124. The third width W3 of the third microstructure 126 is in a range from 325 mm to 330 mm (calculated by the parameters of a horizontal field of view (FOV) of 30 degrees and 0.6 m and a mathematical formula of eye relief), which may provide a larger field of view for drivers. In addition, the head-up display 100 with a larger field of view may provide more auxiliary information related to driving, thus the application value of the head-up display 100 is increased.

In this embodiment, the first microstructure 122 positionally corresponds to the second microstructure 124 in the first direction D1. The second microstructure 124 positionally corresponds to the third microstructure 126 in the second direction D2 perpendicular to the first direction D1. In the present disclosure, the first microstructure 122 is substantially aligned to the second microstructure 124. The light L transmitted by the image generating unit 110 may be expanded along the first direction D1 by the second microstructure 124. The light L may be transmitted to the third microstructure 126 after being expanded along the first direction D1, and the light L may be expanded in the second direction D2 by the third microstructure 126. The light L may be transmitted along the third direction D3. After the light L transmitted by the image generating unit 110 is expanded along the first direction D1 and the second direction D2, the light L may be observed by drivers.

In some embodiments, the first length H1 of the first microstructure 122 is the same as the second length H2 of the second microstructure 124. The third length H3 of the third microstructure 126 is greater than the second length H2 of the second microstructure 124. The third length H3 of the third microstructure 126 is in a range from 190 mm to 200 mm (calculated by the parameters of vertical field of view (FOV) of 18 degrees and 0.6 m and a mathematical formula of eye relief)), which may provide a larger field of view for drivers. In addition, the head-up display 100 with a larger field of view may provide more auxiliary information related to driving, thus the application value of the head-up display 100 is increased.

Figure 2:
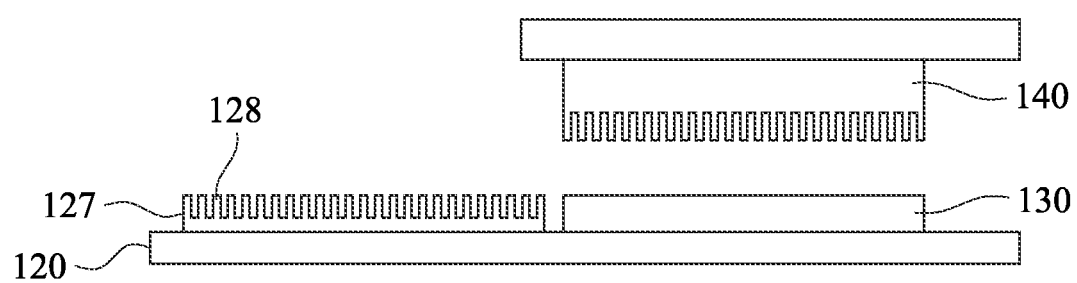
FIG. 2 and FIG. 3 illustrate cross-sectional views at various steps of forming tiling areas according to one embodiment of the present disclosure.
Figure 3:
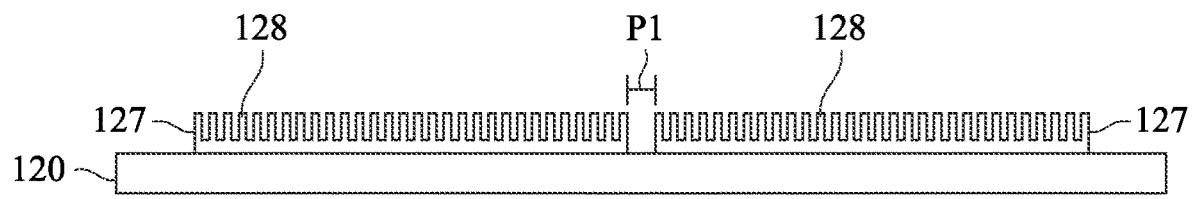

FIG. 2 and FIG. 3 illustrate cross-sectional views at various steps of forming the tiling areas 127 according to one embodiment of the present disclosure. Referring to both FIG. 2 and FIG. 3, an imprinted photoresist 130 may be disposed on a surface of the waveguide glass 120. The imprinted photoresist 130 may be an ultraviolet (UV) photoresist. After the imprinted photoresist 130 is disposed on the waveguide glass 120, a soft film 140 may be used to perform a nano-imprint process on the imprinted photoresist 130, and then a curing process is performed on the imprinted photoresist 130. Therefore, the imprinted photoresist 130 is completely transformed from a half-cured state into a cured state. After the imprinted photoresist 130 is transformed into the cured state, the soft film 140 may be stripped. In this way, the imprinted photoresist 130 may be formed as the tiling areas 127 of the third microstructure 126, and the tiling areas 127 of the third microstructure 126 has protruding portions 128. The protruding portions 128 of the tiling areas 127 are aligned with each other and may be symmetrically arranged along a center line (a dotted line in FIG. 1 and FIG. 4) of the third microstructure 126. A gap P1 is located between the adjacent tiling areas 127. The gap P1 of the tiling areas 127 may be in a range from 0.5 μm to 1.5 μm. It is to be noted that the gap P1 of the tiling areas 127 of the third microstructure 126 is less than half of the first width W1 of the first microstructure 122, so that the user of the head-up display 100 (see FIG. 1) may not readily observe the gap P1. A display quality of the head-up display 100 is improved to improve a user experience of the head-up display 100.

Figure 4:
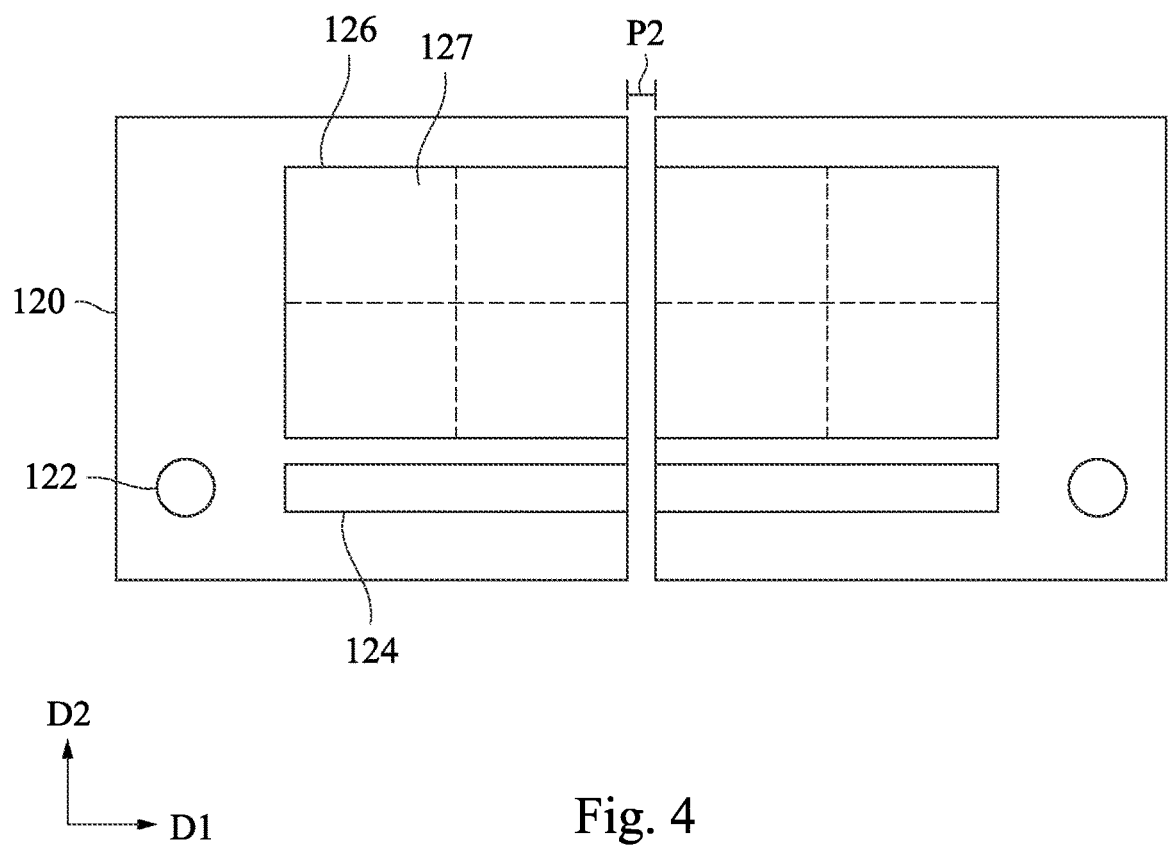
FIG. 4 illustrates a front view of a waveguide glass according to another embodiment of the present disclosure.

FIG. 4 illustrates a front view of a waveguide glass 120 according to another embodiment of the present disclosure. As shown in FIG. 4, the waveguide glass 120 has the first microstructure 122, the second microstructure 124 and the third microstructure 126. In this embodiment, the number of the waveguide glass 120 may be two, but it is not limited in this regard. The waveguide glasses 120 may be adjacent to each other, and a gap P2 is located between the waveguide glasses 120. For example, the gap P2 between the waveguide glasses 120 may be in a range from 0.5 μm to 1.5 μm. The waveguide glasses 120 may increase a display screen of the head-up display 100 (see FIG. 1), and the gap P2 between the waveguide glasses 120 is less than half of the first width W1 (see FIG. 1), so that the user of the head-up display 100 may not readily observe the gap P2, which may improve the user experience of the head-up display 100. In addition, the first microstructure 122 positionally corresponds to the second microstructure 124 in the first direction D1. The second microstructure 124 positionally corresponds to the third microstructure 126 in the second direction D2 perpendicular to the first direction D1.

Figure 5:
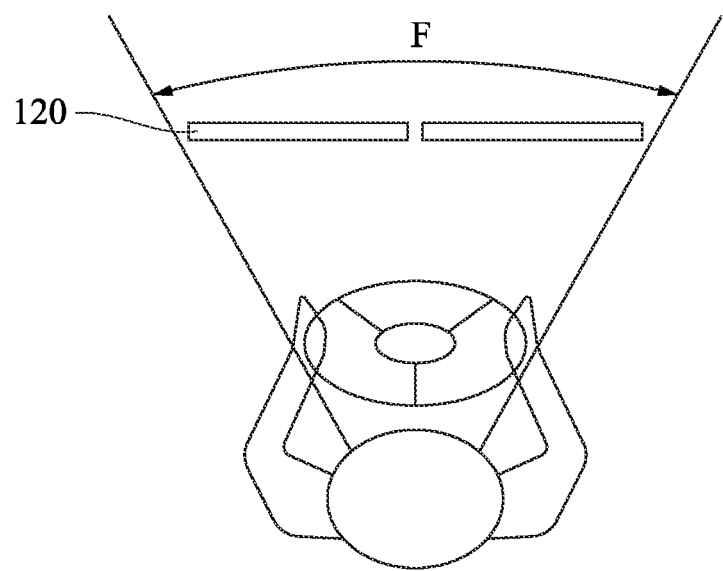
FIG. 5 illustrates a front view of the waveguide glass of FIG. 4 applied to vehicles.

FIG. 5 illustrates a front view of the two waveguide glass 120 of FIG. 4 applied to vehicles. Referring to FIG. 5, the waveguide glasses 120 are arranged adjacently, and a field of view F of the two adjacent waveguide glasses 120 may be in a range from 60 degrees to 80 degrees. The two adjacent waveguide glasses 120 may increase a display size of the head-up display 100 (see FIG. 1). The head-up display 100 with the field of view F in a range from 60 degrees to 80 degrees may provide more driving-related auxiliary information to the driver to increase the application value of the head-up display 100.

Figure 6:
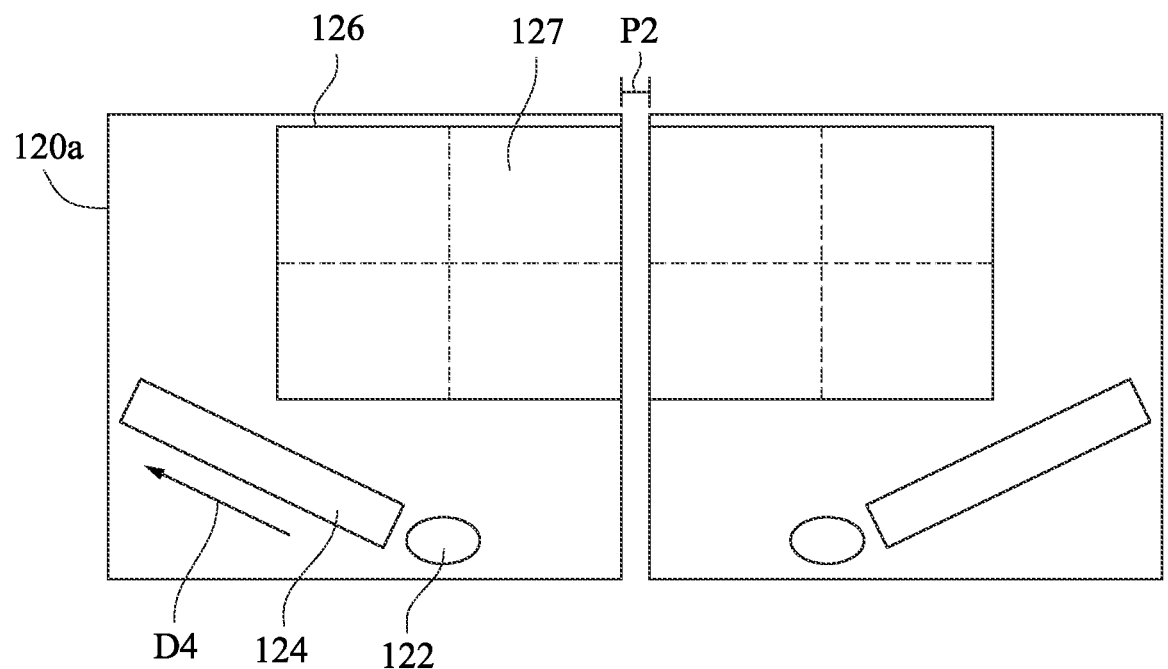
FIG. 6 illustrates a front view of a waveguide glass according to the other embodiment of the present disclosure.

FIG. 6 illustrates a front view of a waveguide glass 120a according to the other embodiment of the present disclosure. As shown in FIG. 6, the waveguide glass 120a has the first microstructure 122, the second microstructure 124 and the third microstructure 126. In this embodiment, the number of the waveguide glass 120a may be two, but it is not limited in this regard. The difference between the waveguide glass 120a of FIG. 6 and the embodiment shown in FIG. 4 is that the first microstructure 122 and the second microstructure 124 of the waveguide glass 120a are arranged along a fourth direction D4. In addition, the waveguide glasses 120a may be disposed adjacent to each other, and the gap P2 is located between the waveguide glasses 120a. For example, the gap P2 between the adjacent waveguide glasses 120a may be in a range from 0.5 μm to 1.5 μm. The waveguide glass 120a may increase the display size of the head-up display 100 (see FIG. 1), and the gap P2 between the waveguide glasses 120a is less than half of the first width W1 (see FIG. 1), so that the user of the head-up display 100 may not readily observe the gap P2, which may improve the user experience of the head-up display 100.

In addition, the waveguide glass 120a of FIG. 6 may be replaced to the waveguide glass 120 of FIG. 5 and applied in vehicles. In the following description, an operating method of a head-up device will be described. It is to be noted that the connection relationship of the aforementioned elements will not be repeated.

Figure 7:
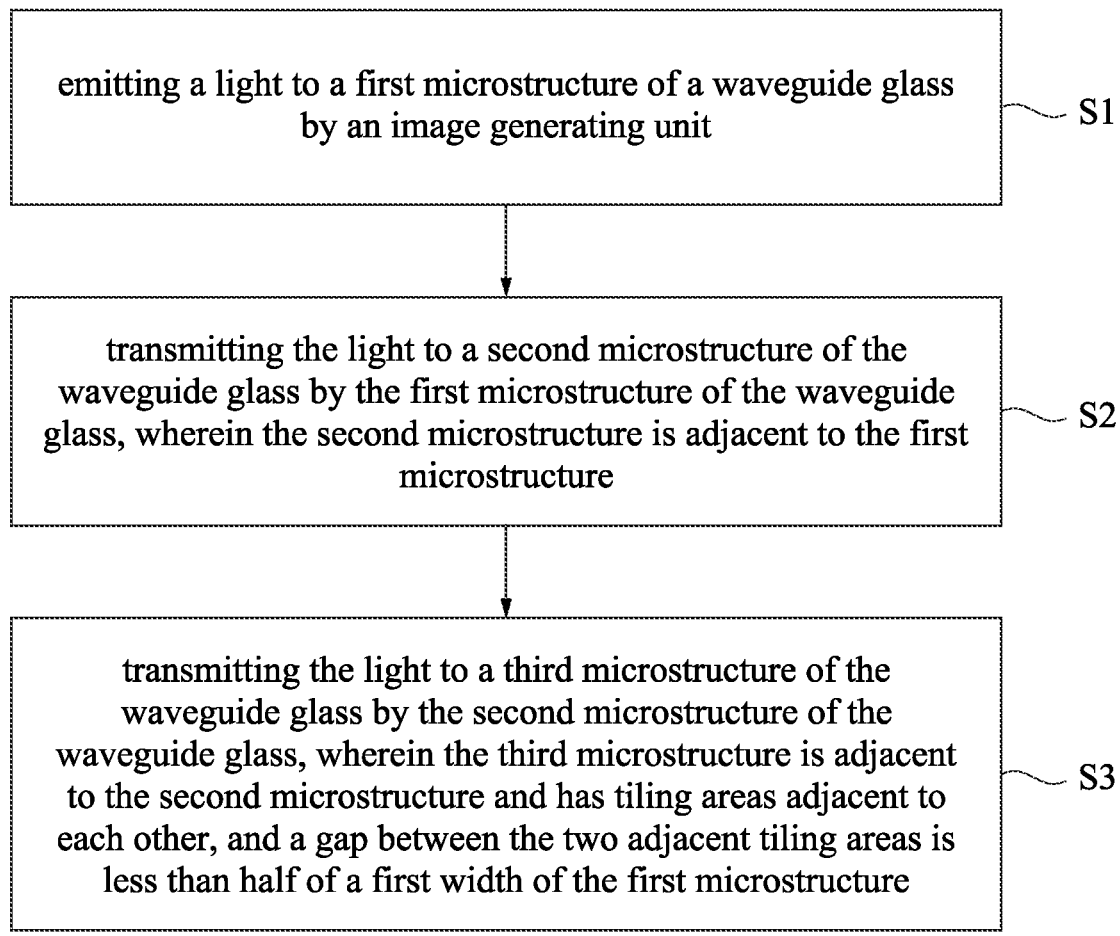
FIG. 7 illustrates a flow chart of an operating method of a head-up display according to one embodiment of the present disclosure.

FIG. 7 illustrates a flow chart of an operating method of a head-up display according to one embodiment of the present disclosure. The operating method of the head-up device includes steps as outlined below. In step S1, a light is emitted to a first microstructure of a waveguide glass by an image generating unit. In step S2, the light is transmitted to a second microstructure of the waveguide glass by the first microstructure of the waveguide glass, wherein the second microstructure is adjacent to the first microstructure. In step S3, the light is transmitted to a third microstructure of the waveguide glass by the second microstructure of the waveguide glass, wherein the third microstructure is adjacent to the second microstructure and has tiling areas adjacent to each other, and a gap between the two adjacent tiling areas is less than half of a first width of the first microstructure. In the following description, the aforementioned steps will be described in detail.

Referring to FIG. 1, the light L may be emitted to the first microstructure 122 of the waveguide glass 120 by the image generating unit 110. Next, the first microstructure 122 of the waveguide glass 120 may transmit the light L to the second microstructure 124 of the waveguide glass 120. In this embodiment, the first microstructure 122 of the waveguide glass 120 may transmit the light L to the second microstructure 124 of the waveguide glass 120 along the first direction D1. Next, the second microstructure 124 of the waveguide glass 120 may transmit the light L to the third microstructure 126 of the waveguide glass 120. In this embodiment, the second microstructure 124 of the waveguide glass 120 may transmit the light L to the third microstructure 126 of the waveguide glass 120 along the second direction D2 perpendicular to the first direction D1. The light L emitted by the image generating unit 110 may be expanded along the first direction D1 and the second direction D2 after passing through the second microstructure 124 and the third microstructure 126, and then the light L may be transmitted to a target area along the third direction D3. In this way, a driver may receive the light L including the driving information.

Referring to both FIG. 1 and FIG. 3, The third microstructure 126 of the waveguide glass 120 has tiling areas 127 adjacent to each other, and the gap P1 between the tiling areas 127 is less than half of the first width W1 of the first microstructure 122. The user of the head-up display 100 may not readily observe the gap P1, and a display quality of the head-up display 100 may be improved to improve the user experience of the head-up display 100.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A head-up display, comprising:
    an image generating unit; and
    a waveguide glass facing toward the image generating unit, and the waveguide glass comprising:
        a first microstructure having a first width;
        a second microstructure adjacent to the first microstructure; and
        a third microstructure adjacent to the second microstructure and having two tiling areas adjacent to each other, wherein a gap between the two adjacent tiling areas is less than half of the first width, and wherein the gap spatially separates the two adjacent tiling areas from each other.

2. The head-up display of claim 1, wherein the first microstructure positionally corresponds to the second microstructure in a first direction.

3. The head-up display of claim 2, wherein the second microstructure positionally corresponds to the third microstructure in a second direction perpendicular to the first direction.

4. The head-up display of claim 1, wherein the first width of the first microstructure is in a range from 4 mm to 5 mm.

5. The head-up display of claim 1, wherein the gap between the two adjacent tiling areas is in a range from 0.5 µm to 1.5 µm.

6. The head-up display of claim 1, wherein one of the two tiling areas of the third microstructure has a plurality of protruding portions, and the protruding portions are aligned to each other.

7. The head-up display of claim 1, wherein the second microstructure has a second width, and the second width is greater than the first width.

8. The head-up display of claim 7, wherein the third microstructure has a third width, and the third width is the same as the second width.

9. The head-up display of claim 8, wherein the third width of the third microstructure is in a range from 325 mm to 330 mm.

10. The head-up display of claim 1, wherein the first microstructure has a first length, the second microstructure has a second length, and the first length is the same as the second length.

11. The head-up display of claim 10, wherein the third microstructure has a third length, and the third length is greater than the second length.

12. The head-up display of claim 11, wherein the third length of the third microstructure is in a range from 190 mm to 200 mm.

13. An operating method of a head-up display, comprising:
    emitting a light to a first microstructure of a waveguide glass by an image generating unit;
    transmitting the light to a second microstructure of the waveguide glass by the first microstructure of the waveguide glass, wherein the second microstructure is adjacent to the first microstructure; and
    transmitting the light to a third microstructure of the waveguide glass by the second microstructure of the waveguide glass, wherein the third microstructure is adjacent to the second microstructure and has two tiling areas adjacent to each other, and a gap between the two adjacent tiling areas is less than half of a first width of the first microstructure, and wherein the gap spatially separates the two adjacent tiling areas from each other.

14. The method of claim 13, wherein transmitting the light to the second microstructure by the first microstructure is performed such that the light is transmitted in a first direction.

15. The method of claim 14, wherein transmitting the light to the third microstructure by the second microstructure is performed such that the light is transmitted in a second direction perpendicular to the first direction.

* * * * *